United States Patent [19]

Lerch

[11] 4,295,752
[45] Oct. 20, 1981

[54] RETAINING ASSEMBLY

[75] Inventor: John A. Lerch, Signal Mountain, Tenn.

[73] Assignee: Vulcan Iron Works Inc., Chattanooga, Tenn.

[21] Appl. No.: 7,316

[22] Filed: Jan. 29, 1979

[51] Int. Cl.³ .................. B25G 3/00; F16D 1/00; F16G 11/00
[52] U.S. Cl. .................. 403/317; 403/409; 403/374; 403/355; 403/356
[58] Field of Search ............... 403/409, 316, 317, 314, 403/374, 263, 355, 356

[56] References Cited

U.S. PATENT DOCUMENTS

| | | | |
|---|---|---|---|
| 1,506,442 | 8/1924 | O'Hara | 403/374 X |
| 2,313,216 | 3/1943 | Blanchard | 403/316 X |
| 2,440,739 | 5/1948 | Conroy | 403/317 |
| 2,462,164 | 2/1949 | Cohen | 403/316 |
| 3,837,023 | 9/1974 | Spencer-Foote | 403/263 X |

*Primary Examiner*—Wayne L. Shedd
*Attorney, Agent, or Firm*—Mason, Kolehmainen, Rathburn & Wyss

[57] ABSTRACT

A retaining assembly for retaining a key or the like within a slot that is defined in a housing includes a bar secured to the key. The bar includes an aperture through which passes a first end of a threaded rod. The rod includes a second end that is adapted to abut against the housing. Threaded on the rod between the housing and the bar is a nut that may be threaded to bear against the bar producing a force against the bar that is transmitted to the key to prevent the key from sliding out of the slot. In the preferred embodiment, the slot and key are tapered.

12 Claims, 4 Drawing Figures

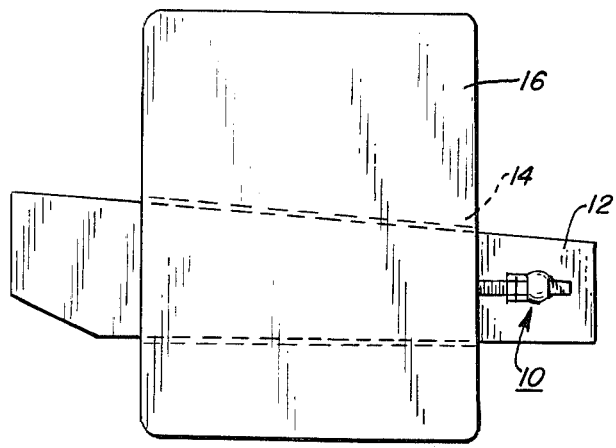
FIG. 1
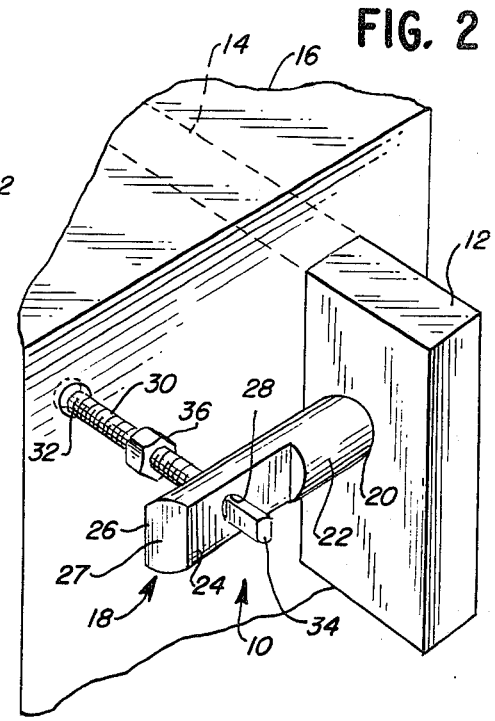
FIG. 2
FIG. 3
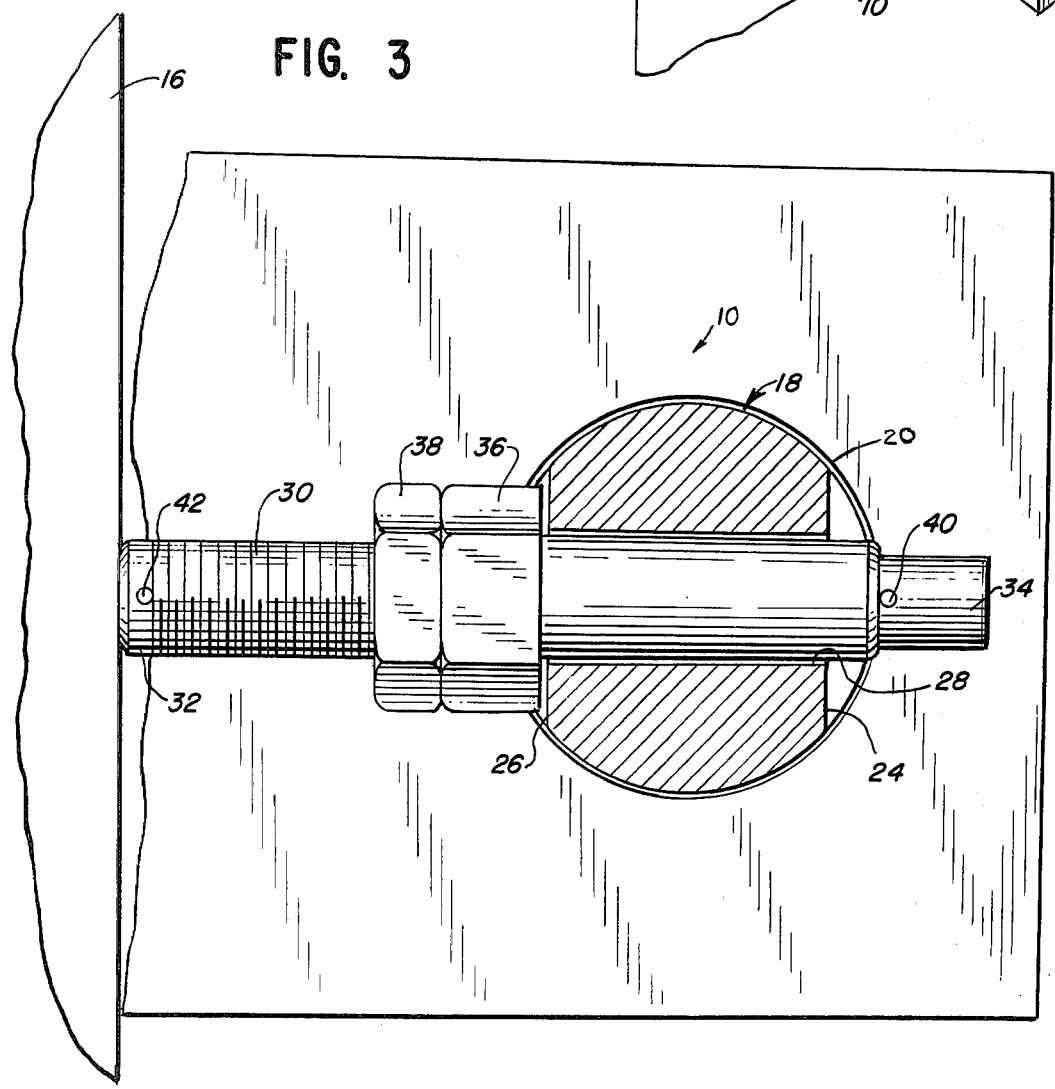

RETAINING ASSEMBLY

BACKGROUND OF THE INVENTION

A. Field of the Invention

The device of the present invention relates to a new and improved assembly for retaining a key or the like in a slot.

B. Description of the Prior Art

Many tools include components that are connected together in a way such that they may be easily disconnected when repair or cleaning is necessary. Although it is desirable that the connected components be easily disconnected, such a goal is often complicated by the fact that the tool is subjected to substantial forces during operation that could loosen the device connecting the components resulting in substantial damage and injury. One use of a tool of the type described is a ram employed for driving piles or the like into the ground.

SUMMARY OF THE INVENTION

An object of the present invention is to provide a new and improved retaining assembly for components of tools.

Another object of the present invention is to provide a new and improved assembly for retaining a key within a slot defined within a housing.

A further object of the present invention is to provide a new and improved assembly for retaining a key within a slot wherein the assembly applies a compressive force on the adjustable portion thereof.

An additional object of the present invention is to provide a new and improved retaining assembly for retaining a part that is tapered and susceptible to falling out of a slot within which the part is positioned if the retaining force is relaxed or eliminated.

The present invention is directed to a new and improved assembly for retaining a part such as a key within a slot defined in a housing wherein the key is employed to couple different elements of a tool such as a ram. The retaining assembly of the present invention in the preferred embodiment is employed to retain a tapered key in a slot of a similar tapered configuration; however, it could be used equally as well to retain an assembly that is not tapered.

The retaining assembly includes a bar that is mounted within an aperture defined in one end of the key. A threaded rod is also included in the assembly and serves to develop the retaining force. The rod includes a first end that passes through an aperture defined in the bar and a second end that is positioned against the housing. A nut is threaded on the rod and may be threaded against the bar to produce a compressive force that is transmitted to the key to retain it within the slot. A locking nut may also be included to lock the retaining assembly in position.

In an alternative embodiment, the housing includes a recess within which the second end of the rod is positioned thus holding the rod in position during operation.

BRIEF DESCRIPTION OF THE DRAWINGS

The above and other objects and advantages and novel features of the present invention will become apparent from the detailed description of a preferred embodiment invention illustrated in the accompanying drawings wherein:

FIG. 1 is a schematic illustration of the retaining assembly retaining a key in a housing, in this case a tapered key but the key could also include parallel sides;

FIG. 2 is an enlarged view of the assembly in a nonretaining position;

FIG. 3 is an enlarged vertical, partially cross-sectioned view of the retaining assembly in the locked position.

DETAILED DESCRIPTION OF THE EMBODIMENTS

Figure 4:
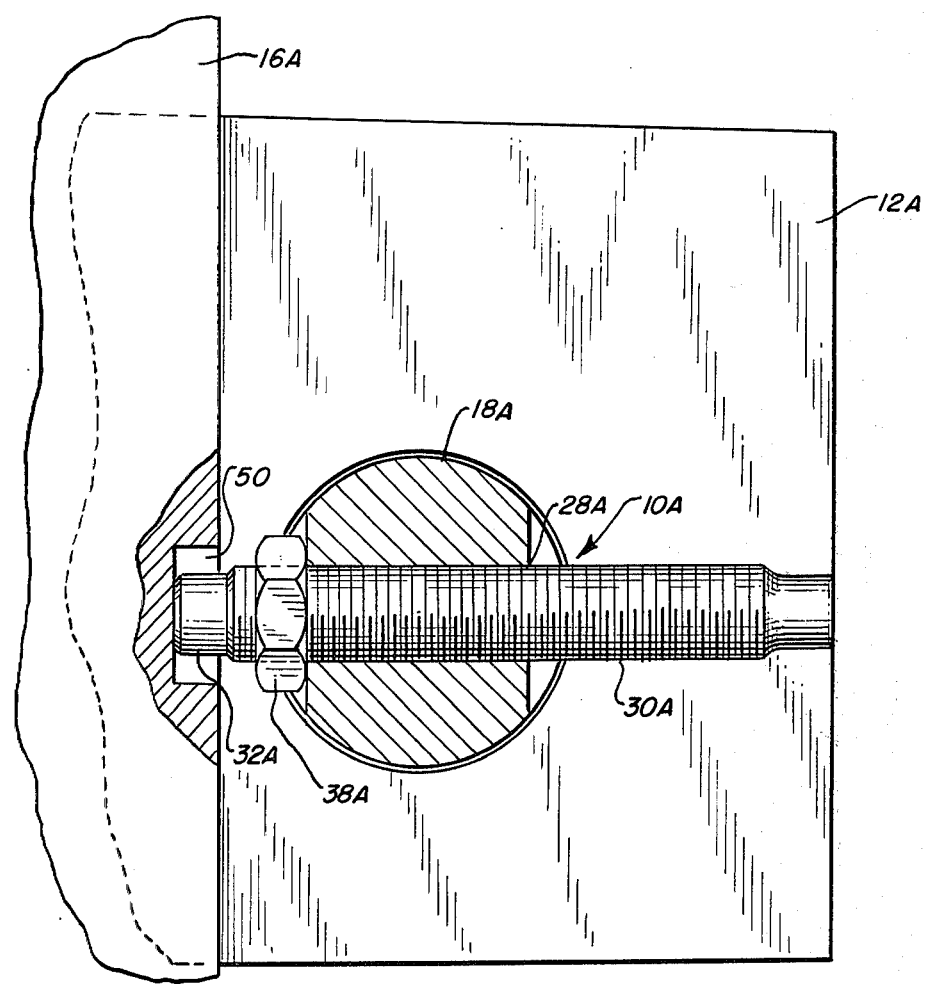
FIG. 4 is a partial cross-sectional view of an alternative embodiment of the present invention.

Referring now to the drawings and initially to FIG. 1 there is illustrated a retaining assembly generally designated by the reference numeral 10 which is in a position to retain a tapered key 12 within a slot 14 that is defined in a housing 16. As illustrated in FIG. 1, the key 12 and the slot 14 are of a tapered configuration such as that retaining forces are imparted to the key 12 in a rightward direction to retain the key 12 in the slot 14. In the configuration shown, if the retaining force developed by the retainer 10 is decreased or eliminated, the key 12 could slip out of the slot 14 in a leftward direction.

The retaining assembly 10 is intended to maintain the key 12 within the slot 14 during the operation of a tool generally identified as the housing 16, which may be a ram or the like. Depending on the force desired there would be one or two assemblies 10, on one side as shown or a similar unit on the other sde of key 12. More specifically, the retaining assembly 10 is located at the narrow end of the key 12 to maintain the key 12 in close bearing against the edges of the tapered slot 14 within the housing 16. To accomplish this, the retaining assembly 10 includes a bar 18 that is positioned within an aperture 20 defined in the key 12 thus mechanically connecting the bar 18 to the narrow end of the key 12. The bar 18 is rounded in the portion within the key 12 shown as 22 that is positioned in the aperture 20 and includes first 24 and second 26 flat portions defined on each or one end 27.

In addition, the bar 18 includes an aperture 28 through which a threaded rod 30 passes. The threaded rod 30 includes a first end 32 that is adapted to abut against the housing or ram 16 and includes a second unthreaded end 34 that passes through the aperture 28 and is flat sided in a preferred configuration to allow a tool such as a wrench to be placed thereon.

Threaded on the rod 30 between the end 32 and the bar 18 is a nut 36. A wrench may be placed on the nut 36 and a second wrench may be placed on the end 34 of the rod 30 thus tightening the nut 36 toward and against the bar 18. As this occurs, the nut 36 applies a force on the bar 18 and an equal and opposite force on the end 32 such that the rod 30 is pushed against the housing 16. The force imparted on the bar 18 is transmitted through the mechanical connection of the aperture 20 to the key 12 to move the key 12 in a rightward direction in FIG. 1 causing a close bearing engagement of the key 12 against the edges of the slot 14 thereby retaining the key 12 within the housing 16.

Once the desired retaining force has been developed by the nut 36, a second or locking nut 38 may be also rotated on the threaded bar 30 to an abutting position against the nut 36 thus locking the nut 36 in position against the bar 18.

The rod 30 also includes first 40 and second 42 pins that prevent the retaining assembly 10 from separating from the key 12 at such times when there is no strain or force developed by the nut 36.

Having reference now to FIG. 4, there is illustrated an alternative embodiment of the retaining assembly is generally designated by the reference numeral 10A. The retaining assembly 10A includes similar components as the retaining assembly 10; a pressure bar 18A and a rod 30A that is threaded along its entire length. In the alternative embodiment, however, the housing 16A includes a recess 50 within which the end 32A of the rod 30A is positioned and this eliminates the need for the pins 40 and 42. In addition, the aperture 28A defined in the bar 18A is threaded such that the rod 30 is threaded into the bar 18A as opposed to having a slip fit as illustrated in the embodiment of FIGS. 1-3. Accordingly, the nut 36 of the first embodiment is not necessary in the embodiment illustrated in FIG. 4; however, a lock nut 38A is employed and used in the same manner as the lock nut 38 previously described.

While only two embodiments of the present invention have been shown, it will be understood that various changes and modifications may occur to those skilled in the art and it is contemplated by the appended claims to cover all such changes and modifications as are within the true spirit and scope of the present invention.

What is claimed as new and desired to be secured by Letters Patent of the United States is:

1. A retaining assembly for retaining a key in a housing of a ram or the like wherein said housing includes a slot in which said key is to be retained, said assembly comprising,
   a mechanical connecting member secured to said key, said connecting member including an aperture,
   a force application member including a first end extending through said aperture and a second end abutting said housing, and
   a force generating element mounted on said force application member between said housing and said mechanical connecting member, said force generating member adapted to generate a force against said mechanical coupling member and said housing whereby said key is retained in said slot.

2. The assembly claimed in claim 1 wherein said slot and said key each include at least one tapered surface.

3. The assembly claimed in claim 1 wherein said force application element comprises a threaded rod.

4. The assembly in claim 1 wherein said force generating element comprises a nut threaded on said rod.

5. The assembly claimed in claim 1 wherein said mechanical coupling member comprises a bar including an aperture through which said force application member passes.

6. The assembly claimed in claim 3 wherein said second end of said rod includes at least one flat surface that may be grasped by a tool.

7. The assembly claimed in claim 1 wherein said housing includes a recess in which said first end of said force application member is positioned.

8. An assembly for retaining a key or the like in a slot defined in a housing wherein said slot and said key are tapered comprising
   a bar secured to said key, said bar including an aperture,
   a threaded rod including a first and extending through said aperture and a second end abutting said housing, and
   a nut threaded on said rod between said housing and said bar.

9. The assembly set forth in claim 8 wherein said first end is of a configuration for a tool to be applied to said first end to rotate said bar.

10. The assembly set forth in claim 8 wherein said housing includes a recess in which said second end of said rod is positioned.

11. The assembly set forth in claim 8 wherein said aperture is threaded and said rod is threaded therein to develop a retaining force on said key.

12. An assembly for retaining a key or the like in a slot defined in a housing wherein said slot and said key are tapered comprising
   a bar secured to said key, said bar including an aperture,
   a threaded rod including a first end extending through said aperture and a second end abutting said housing, and
   said aperture is threaded and said rod is threaded therein to develop a retaining force on said key.

* * * * *